United States Patent
Schultz

(10) Patent No.: US 7,268,345 B2
(45) Date of Patent: Sep. 11, 2007

(54) OPTICAL SCANNER AND METHOD FOR 3-DIMENSIONAL SCANNING

(76) Inventor: Howard J. Schultz, 108 Wildflower Dr., Amherst, MA (US) 01002

( * ) Notice: Subject to any disclaimer, the term of this patent is extended or adjusted under 35 U.S.C. 154(b) by 344 days.

(21) Appl. No.: 10/414,676

(22) Filed: Apr. 16, 2003

(65) Prior Publication Data

US 2003/0202095 A1    Oct. 30, 2003

Related U.S. Application Data

(60) Provisional application No. 60/373,245, filed on Apr. 16, 2002.

(51) Int. Cl.
*H01J 3/14* (2006.01)
*G01B 11/24* (2006.01)
*H04N 1/04* (2006.01)

(52) U.S. Cl. ............ 250/235; 356/611; 358/474

(58) Field of Classification Search ............ 250/235, 250/234, 208.1; 358/474, 475, 487, 497, 358/494; 382/321, 323; 356/602, 607, 608, 356/611; 396/322–331
See application file for complete search history.

(56) References Cited

U.S. PATENT DOCUMENTS

| | | | | |
|---|---|---|---|---|
| 4,044,384 A | * | 8/1977 | Inokuchi | 358/461 |
| 4,234,241 A | | 11/1980 | Schmidt | 348/52 |
| 4,510,525 A | | 4/1985 | Kuperman et al. | 356/4.01 |
| 5,140,443 A | * | 8/1992 | Iwahara et al. | 358/474 |
| 5,694,235 A | * | 12/1997 | Kajiki | 359/202 |
| 5,712,803 A | * | 1/1998 | Garuet-Lempirou | 702/158 |
| 5,886,775 A | | 3/1999 | Houser et al. | 359/220 |
| 5,898,508 A | * | 4/1999 | Bekanich | 358/474 |
| 2003/0025947 A1 | * | 2/2003 | Spears et al. | 358/474 |

FOREIGN PATENT DOCUMENTS

DE    4213281 C1  *  7/1993

OTHER PUBLICATIONS

Dr. Richard Schubert, Stereoscopic Scanner in Quality Control, Stereoscopic Scanning; 3D in Industry & Multimedia, Reprint, Proc. Conf. 'Quality Control by Artificial Vision', May 1999, pp. 1/6, Trois-Rivieres, Quebec., Canada.

* cited by examiner

*Primary Examiner*—Thanh X. Luu
(74) *Attorney, Agent, or Firm*—McCormick, Paulding & Huber LLP

(57) ABSTRACT

An optical scanner for three-dimensional scanning comprises: a support bed; a flat, transparent plate; guide rails under the transparent plate; a carriage slidably attached to the guide rails; and one or more sensors attached to the bed/case or carriage. For three-dimensional imaging, multiple scanned images of the object are obtained, each of which is from light reflecting off the object at a different angle with respect to the path of the carriage. This is done by shining light on the object and appropriately channeling reflected light, from at least two different directions, into the sensor(s). In one embodiment, the carriage has three CCD sensors, one oriented rearwards (with respect to the path of travel of the carriage), one oriented vertically, and one oriented forwards—each effectively "sees" the object from a different orientation. The multiple scanned images can be used for stereoscopic viewing and/or three-dimensional rendering using a computer.

20 Claims, 7 Drawing Sheets

OPTICAL SCANNER AND METHOD FOR 3-DIMENSIONAL SCANNING

This application claims priority from a Provisional Application, Ser. No. 60/373,245, filed Apr. 16, 2002.

FIELD OF THE INVENTION

The present invention relates to optical scanners and, more particularly, to optical scanners for three-dimensional scanning.

BACKGROUND

In a broad sense, three-dimensional ("3-D") scanning involves using a machine to capture or record the shape of an object in three dimensions, typically for purposes of forming a 3-D representation of the object (e.g., a stereoscopic picture or computer-aided design (CAD) model). As such, 3-D scanning has many uses, including: computer vision, visualization methods, and/or "virtual reality," e.g., with 3-D monitors and goggles; parts inspection; modeling; security scans; manufacturing; and stereolithography.

Over the years, various devices have been developed for 3-D scanning, many of which are necessarily quite sophisticated. For example, one commercially-available system (see www.3dscanners.com) uses a laser and camera system for laser stripe triangulation. This involves moving a laser line across the object, which is then viewed by an off-angle camera such that height/size variations in the object are seen as changes in line shape. Another system (see www.rolanddga.com) utilizes direct contact, where an array of piezoelectric sensors (flexible elements whose output voltage is proportional to the mechanical pressure applied to them) is dragged across the object.

While these systems generally work well, they can be quite expensive, and are therefore unattractive to consumers, businesses, and other organizations who have limited budgets or who only need occasional 3-D scanning capability. Accordingly, developers have sought to use more widely available (and less expensive) scanners, e.g., flatbed optical scanners or photocopiers, to achieve similar results.

Flat-bed, optical (light-based) scanners are used to copy two-dimensional documents and to transfer documents to computer. For example, in the case of a traditional photocopier, light is sequentially applied to portions of a document, which reflects off the document and onto the surface of a charged photoreceptive drum. Toner (charge-sensitive "ink") is attracted to the drum in areas where light did not hit the drum, resulting in a toner pattern that corresponds to the pattern of dark (e.g., text) on the document. The toner is subsequently transferred to a blank sheet of paper, resulting in a copy of the document. In the case of computer scanners, light is also "bounced off" a document, but instead of being applied to a photoreceptive drum, it is applied to a CCD (charge-coupled device) array or other appropriate type of sensor, either directly or via a series of mirrors and lens. The CCD array converts the light into electrical charges which can be read by the computer and converted into an image of the scanned document.

FIGS. 1A and 1B show existing scanners. There, an object 20 is placed on the scanner's flat glass plate 22. In the case of a "moving sensor"-type scanner 24 (FIG. 1A), a carriage or head 26 has an optic axis 27 (here, vertically-oriented), and a CCD array or other sensor 28. For scanning, the carriage 26 is moved under the object 20. The sensor 28 detects light reflecting straight down off the object 20 through the glass 22, either directly or via a mirror/lens system also attached to the carriage. In the case of a "moving mirror"-type scanner 30 (FIG. 1B), the sensor 28 is stationary, and light is directed from the object to the sensor via an appropriately-angled, rectangular mirror 32, which is attached to the moving head or carriage 26.

While existing copiers and scanners work very well with two-dimensional documents, they are not capable of creating 3-D representations of objects by themselves. More specifically, to the extent copiers and scanners can be used to scan objects, the result is simply a flat, single-orientation picture of the object, without any true sense of the object in three dimensions. Moreover, light from portions of the object away from the scanner's or copier's flat glass plate is oftentimes not received by the CCD array or photoreceptive drum, resulting in dark or "muddy" pictures. However, it is possible to convert, adapt, and/or otherwise utilize conventional flatbed optical scanners and scanning technology to capture 3-D images.

One such system (see www.stereoscopicscanning.de) involves taking two scans of a generally-flat (but still three-dimensional) object. For the first scan, the object is positioned on the right side of the scanning path, and for the second scan, the object is positioned on the left side of the scanning path. As should be appreciated, this results in two flat pictures of the object at different orientations, which can be converted into a stereoscopic image. Additionally, multiple scans of the object can be taken, with the object being successively moved laterally (with respect to the path of the scanning element), for each scan. The successive string of pictures, each of the object at a slightly different orientation, can be displayed sequentially to produce an illusion of the object rotating in three dimensions, like a flip book or cartoon. However, while this system produces some interesting results, it is disadvantageous because the object itself has to be moved, requiring either manual input or a separate movement mechanism. Furthermore, it is quite difficult to convert the images into accurate computer form because of left-to-right light divergence and because the relationship of the lateral angle of the object with respect to the scanner/CCD array is unknown and/or difficult to measure with accuracy.

Accordingly, a primary object of the present invention is to provide an inexpensive and easily-constructed flatbed optical scanner capable of obtaining an accurate model or other representation, in three dimensions, of a non-flat object.

SUMMARY

An optical scanner for three-dimensional scanning (the "3-D scanner") comprises: a support bed or case; a flat, transparent (glass) plate; one or more guide rails under the transparent plate; a crossbar or carriage slidably attached to the guide rails; and one or more sensors attached to the bed/case or carriage. To capture a three-dimensional image of an object, multiple scanned images of the object are obtained, each of which is from light reflecting off the object at a different angle with respect to the path of the carriage. This is done by: placing the object on the transparent plate; shining light on the object; and appropriately channeling the light that reflects off the object, from at least two different directions, into the sensor(s). The multiple scanned images can be used for stereoscopic viewing and/or three-dimensional modeling or imaging using a computer.

For capturing the multiple scanned images at different angles, in a first embodiment, the carriage supports a light source and a group of three (at least two) CCD arrays or other sensors. The first CCD array is oriented rearwards (with respect to the path of travel of the carriage), the second CCD array is oriented vertically, and the third CCD array is oriented forwards. In use, the light source is activated, and the carriage is slid along the guide rails. Light bounces off the object and into the arrays, each of which effectively "sees" the object from a different orientation. This produces three images of the object, any two of which form a stereoscopic view of the object, and which can be used to produce a three-dimensional rendering of the object using a suitable, standard computer image processor.

Other embodiments include: using one or more appropriately-angled mirrors attached to the carriage to reflect the light that bounces off the object into one or more CCD arrays or other sensors (attached to the carriage or to the bed/case); using a prism to direct light into two or more uniformly-oriented sensors; and passing a single mirror under the object multiple times, with the angle of the mirror being changed each time by a stepper motor or the like.

For implementing the 3-D scanner, various standard optics elements may be provided for appropriately guiding and/or "processing" the light reflected off the scanned object. For example, apertures, mirrors, lenses, and prisms may be used to appropriately channel light to the sensors, and a lens system may be used for focusing and/or demagnifying the light onto the sensors.

BRIEF DESCRIPTION OF THE DRAWINGS

These and other features, aspects, and advantages of the present invention will become better understood with respect to the following description, appended claims, and accompanying drawings, in which:

DETAILED DESCRIPTION

Figure 1A:
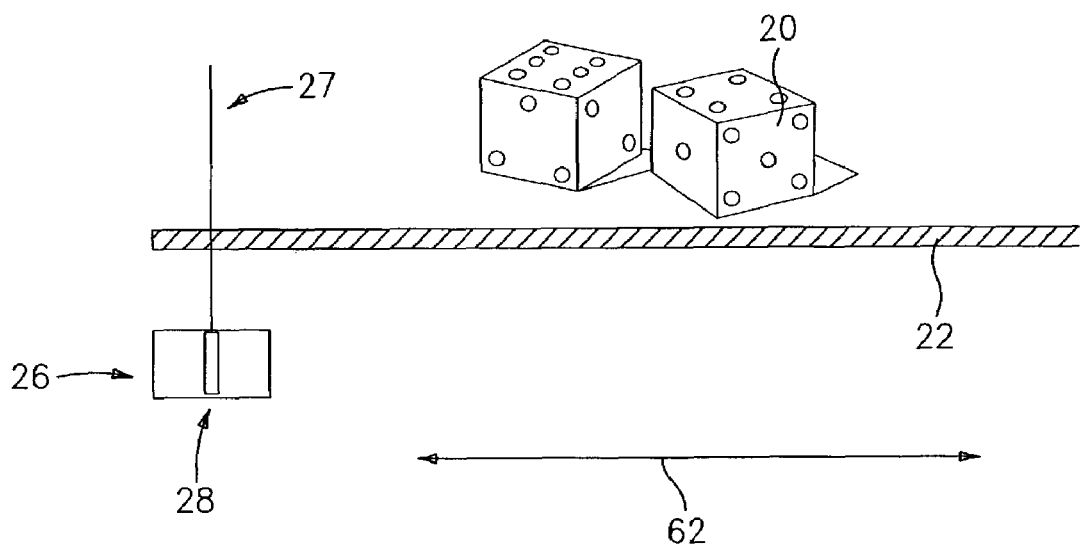
FIGS. 1A & 1B are schematic side elevation views of prior art scanners.
Figure 1B:
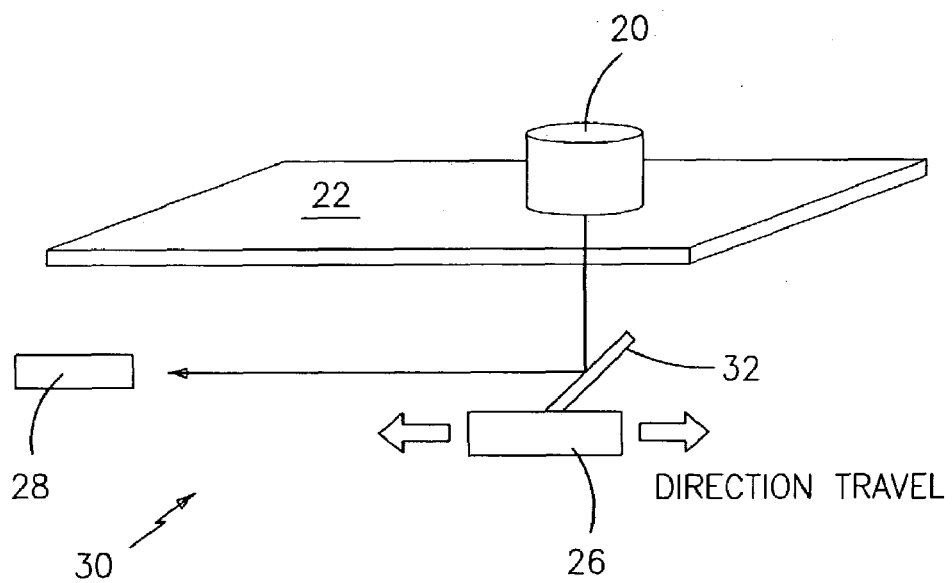
Figure 2:
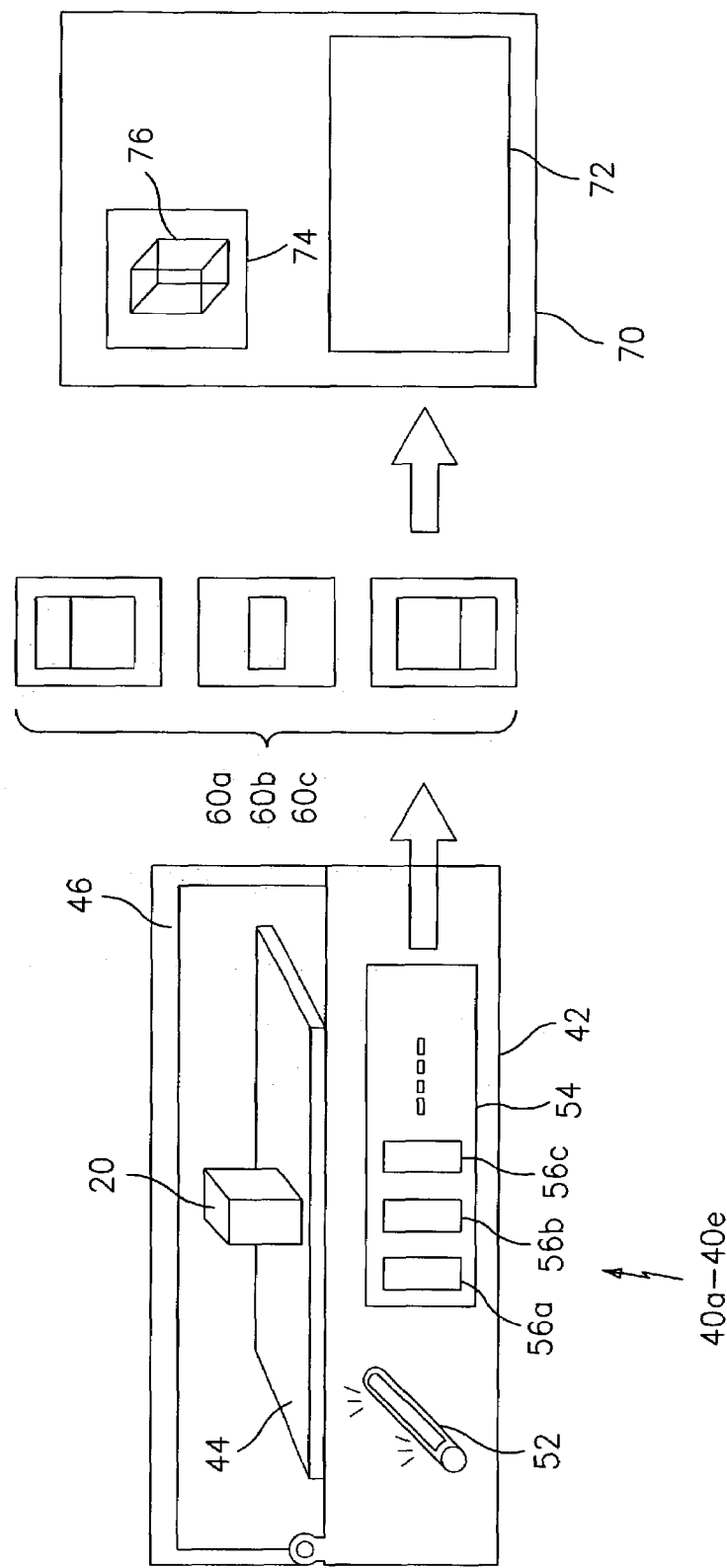
FIG. 2 is a schematic diagram of an optical scanner for three-dimensional scanning of objects ("3-D scanner") according to the present invention.

Turning now to FIGS. 2-9, various embodiments of a 3-D scanner 40a-40e, according to the present invention, will now be described. The 3-D scanner 40a-40e is generally similar to a conventional flat-bed scanner or photocopier, and, as such, comprises: a support bed or case 42; a flat, transparent plate 44 (e.g., glass or plastic) supported by the bed 42; some sort of backdrop-like cover 46 which fits over the transparent plate 44; and, typically, one or more guide rails 48a, 48b under the transparent plate 44. In a first embodiment of the 3-D scanner 40a (a moving sensor-type scanner), a crossbar or carriage 50 is slidably attached to the rails 48a, 48b. The carriage supports a light source 52 and a group 54 of CCD arrays or other sensors 56a-56c. The first CCD array 56a is oriented rearwards (with respect to the path of travel of the carriage 50), the second CCD array 56b is oriented vertically, and the third CCD array 56c is oriented forwards. In use, an object 20 is placed on the transparent plate 44, the light 52 is activated, and the carriage 50 is slid along the rails 48a, 48b (by a standard scanner stepper motor/control unit, not shown). Light bounces off the object and into the arrays 56a-56c, each of which effectively "sees" the object from a different orientation. This produces three images 60a-60c of the object 20, any two of which form a stereoscopic view of the object.

According to the present invention, the general process for using conventional flat-bed scanner technology to capture a 3-D image of an object involves obtaining multiple scanned images of the object 20, each of which is from light reflecting off the object at a different angle with respect to the path 62 of the carriage 50. Thus, in the case of the first embodiment of the 3-D scanner 40a shown in FIGS. 3-4B, when the carriage 50 is moved under the object 20, the rearward-oriented array 56a receives light reflected from the object at, e.g., 45°, the vertically-oriented array 56b receives light reflected from the object at 90°, and the forward-oriented array 56c receives light reflected from the object at, e.g., 135°. This effectively results in three different images 60a-60c of the object 20 (one from the forward-looking array, one from the vertical-looking array, and one from the rearward-looking array), any two of which are stereoscopic. That is, when two of the scanned images are viewed through an appropriate, conventional stereoscopic viewing device, the viewer will see the object 20 in "3-D." Moreover, because the object 20 is not moved during the scanning process, and because the view angles are with respect to the carriage's path of movement, the degree of stereopsis (the strength of the 3-D illusion when viewing a pair of stereoscopic images) of the images 60a-60c is independent of the distance from the object to the scanner optics.

As should be appreciated, as with conventional scanners, the CCD arrays 56a-56c or other sensors do not form images of the object 20 per se. Rather, as the arrays 56a-56c are moved under the object, the electrical output of each array is fed serially into the scanner's control circuit (not shown), which is akin to the standard circuitry found in any scanner. This information is converted to a standard format (e.g., TWAIN), if needed, and is then electronically transmitted to a standard computer 70, which is outfitted with conventional scanning software 72. The conventional software 72 then takes the output of the scanner 40a (here, three separate sets of information corresponding to the three images of the object 20), and processes it as directed by a user. For example, the information can be stored, or assembled/converted for display on a computer monitor.

Once the multiple images of the object 20 have been obtained, it is possible to use them for more than just stereoscopic viewing. For example, the images can be used to extrapolate a true 3-D representation or model of the object. This is because the stereoscopic views generated by the 3-D scanner 40a preserve the three-dimensional structure of the object in image form, which can then be used in conjunction with a standard three-dimensional rendering software program 74 to produce rendered 3-D views 76 (e.g., a CAD wire frame model) of the object 20. Further, users of the 3-D scanner can convey the three-dimensional structures of objects using any means suitable for conveying conventional images, e.g., facsimile or mail.

In order to obtain optimum light reception by the CCD arrays 56a-56c, it may be necessary to provide one or more mirror/lens systems, even in the case of moving scanner-type scanners. Such optical systems, which are well known in the industry (e.g., desktop scanners typically have such a system), help to direct and focus the light that is reflected off the object 20 into the CCD arrays, which are typically much narrower than the width of the scanning surface (transparent plate 44).

Conventional "2-D" scanners have a very narrow depth-of-focus, since they are meant to only scan what is directly in contact with the transparent plate 44. According to the present invention, however, the 3-D scanner 40a-40e is meant to produce multi-view stereoscopic views of an object, which requires obtaining images of portions of the scanned object away from the transparent plate. Accordingly, the 3-D scanner 40a-40e will typically have a deeper depth-of-focus, for purposes of ensuring that portions of the object 20 away from the transparent plate 44, as well as those in contact with the top of the transparent plate, are in focus when scanned. A proper optics system with a deep depth-of-focus can be designed using conventional optics design methods, as known by those in the optics field (e.g., depth-of-focus/field depends upon the aperture, the focal length of the lens, and the distance from the lens to the object). Also, if using an existing, conventional scanner as a base, it may be necessary to adjust the scanner's existing optical system (or provide a different system) to obtain a deep depth-of-focus.

Figure 5:
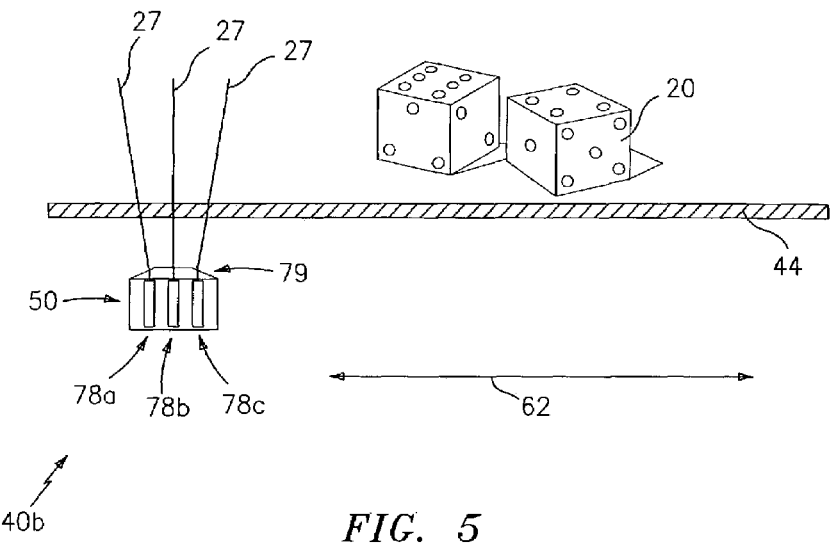
FIG. 5 is a schematic side elevation view of a second embodiment of the 3-D scanner.

FIG. 5 shows a second embodiment of the 3-D scanner 40b. The scanner 40b (which is of the moving-sensor type) is generally similar to the 3-D scanner 40a, but has three vertically-oriented CCD arrays or other sensors 78a-78c attached to the carriage 50 instead of one vertically-oriented sensor and two angled sensors. For channeling light reflecting off the object 20 at different angles, a compound prism 79 (or it could be two or three separate prisms) is operably attached to the carriage and sensors, as shown. In use, the light source 52 is activated, and the carriage 50 is moved under the object 20. Light reflecting off the object 20 straight downwards (i.e., at a right angle relative to the carriage's direction of travel 62) passes through the center portion of the prism 79 and straight into the middle sensor 78b. Similarly, light reflecting off the object 20 at "forward" and "rearward" angles hits the side ends of the prism, which causes the light to refract (bend) and pass into the other two sensors 78a, 78c.

As mentioned, the operative principle behind the present invention is to obtain multiple images of an object at different orientations, by way of receiving light that reflects off the object at different angles with respect to the scanner's path of movement. To do so, moving mirror-type scanner mechanisms can be used, as shown in FIGS. 6-8, instead of moving sensor-type scanner mechanisms.

Figure 3:
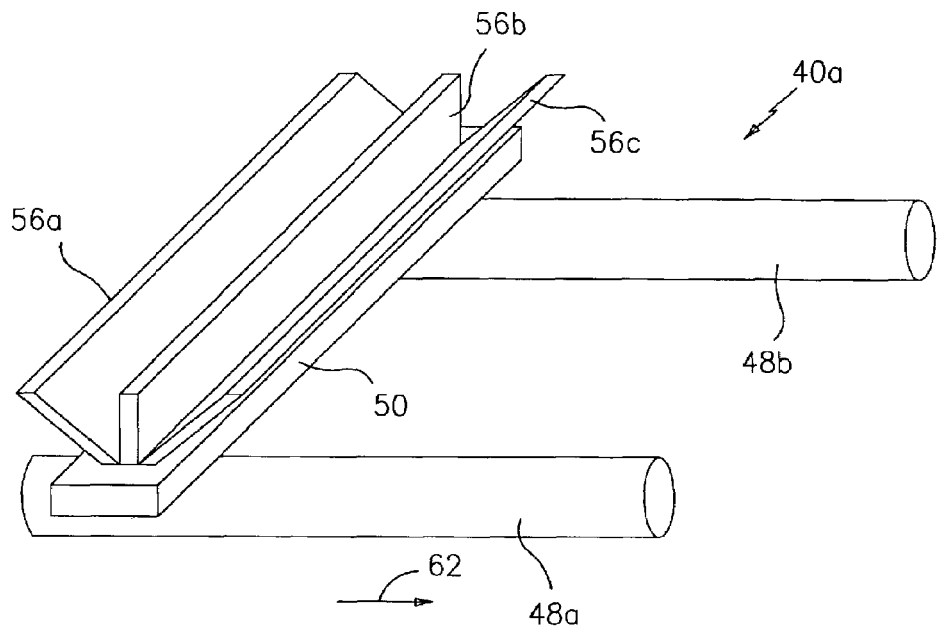
FIGS. 3, 4A, & 4B are conceptual or schematic views of a first embodiment of the 3-D scanner.
Figure 4A:
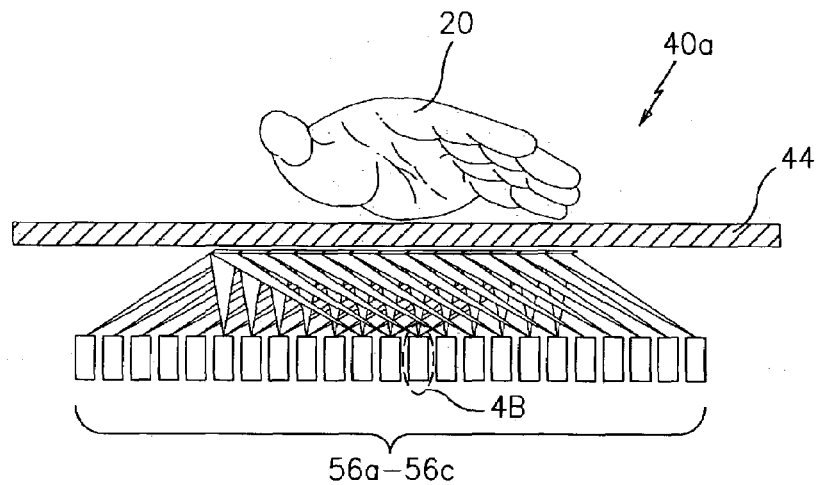
Figure 4B:
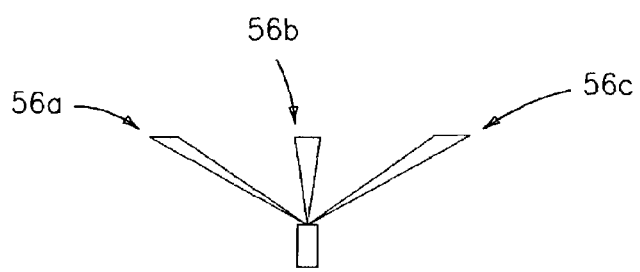
Figure 6:
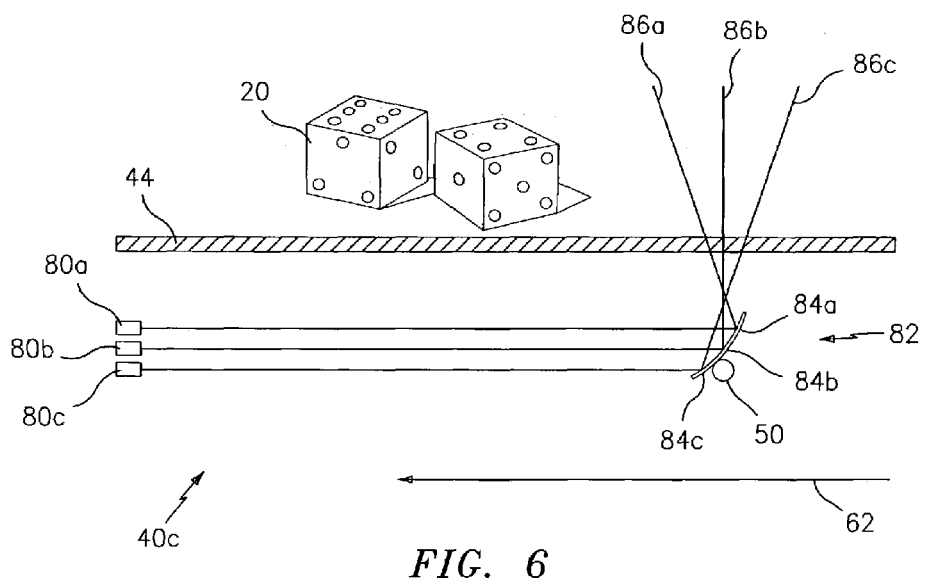
FIG. 6 is a schematic side elevation view of a third embodiment of the 3-D scanner.

FIG. 6 shows a third embodiment of the 3-D scanner 40c. Here, top, middle, and bottom CCD arrays or other sensors 80a, 80b, 80c, respectively, are arranged vertically. However, instead of being attached to the carriage 50 as shown in FIGS. 3-5, the arrays 80a-80c are non-movably attached to the interior of the scanner bed 42. Additionally, a compound mirror 82, effectively comprising three successive, obtusely-angled mirror strips 84a-84c (rectangular pieces of mirror whose widths are the same as the scanning width of the scanner), is attached to the carriage 50, and, therefore, can be moved along and under the transparent plate 44. Further, the mirror strips 84a-84c are respectively aligned with the arrays 80a-80c, such that light from different views of the object 20 is reflected into separate CCD arrays. Specifically, the "top" mirror strip 84a has a forward field-of-view 86a, the "middle" mirror strip 84b has a nadir field-of-view 86b, and the "bottom" mirror strip 84c has a backward field-of-view 86c.

In use, the object 20 is set on the transparent plate 44, and the 3-D scanner 40c is activated. The light source 52 is turned on, and the carriage 50 and compound mirror 82 are moved under the object. Light from a "forward view" of the object 20 reflects off the top, most steeply-angled mirror strip 84a and into the top sensor array 80a. Similarly, light that reflects off the object straight down (vertically) reflects off the middle mirror strip 84b and into the middle sensor array 80b, and light from a "rear view" of the object 20 reflects of the bottom mirror strip 84c and into the bottom sensor array 80c. Thus, although the sensors do not move and are not differently aligned, they each effectively receive a different image of the object 20.

Figure 7:
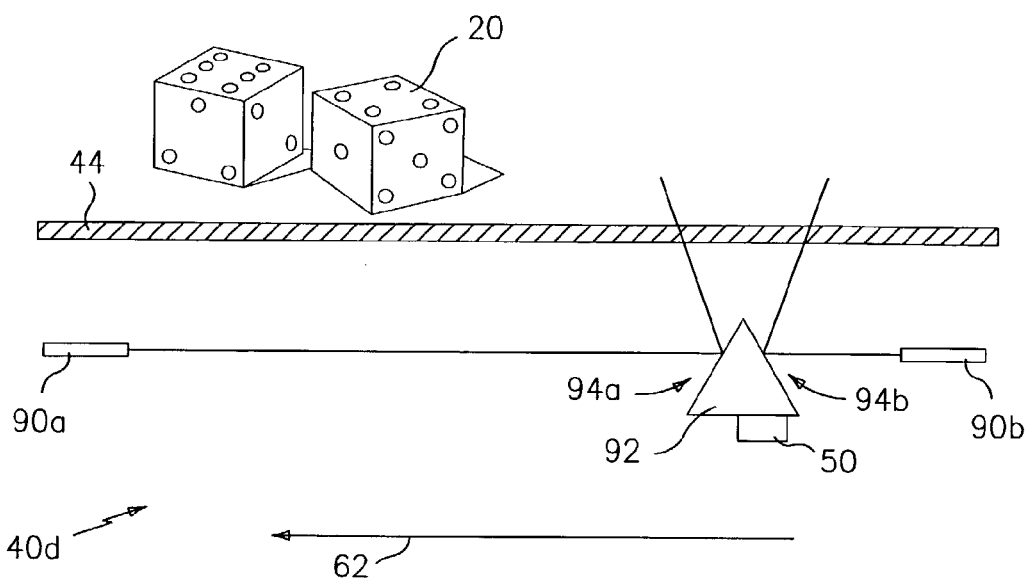
FIG. 7 is a schematic side elevation view of a fourth embodiment of the 3-D scanner.
Figure 8:
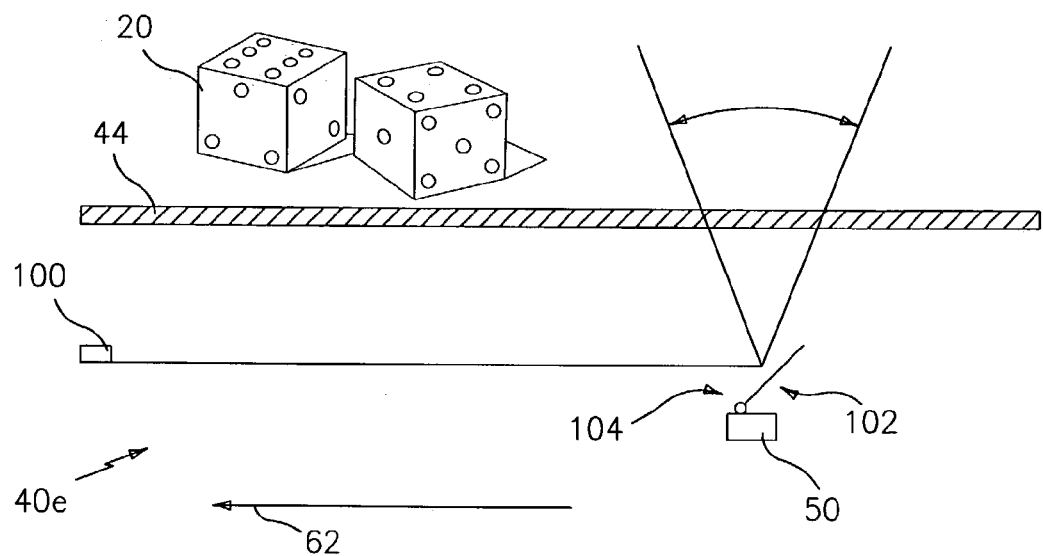
FIG. 8 is a schematic side elevation view of a fifth embodiment of the 3-D scanner.

FIG. 7 shows a fourth embodiment of the 3-D scanner 40d. Here, there are two non-moving CCD arrays or other sensors 90a, 90b, one at either end of the scanner 40d. Additionally, a "triangular" compound mirror 92, comprising forward and rear mirror strips 94a, 94b (again, rectangular pieces of mirror having about the same width as the scanning width of the scanner) oriented at an acute angle with respect to one another, is attached to the carriage 50. The mirror strips 94a, 94b and sensors 90a, 90b are oriented such that when the carriage 50 is moved under the glass plate 44, light from one direction reflects off the forward mirror 94a and into the sensor 90a, and light from another direction reflects off the rear mirror 94b and into the sensor 90b. This results in two different images of the object 20, which are sufficient for stereoscopic purposes and for capturing the three-dimensional structure of the object 20.

FIG. 8 shows a fifth embodiment of the 3-D scanner 40e. Here, instead of having multiple sensors or multiple mirrors, a single CCD array or other sensor 100 is affixed to the scanner bed 42, and a rotating mirror 102 is attached to the carriage 50. The rotating mirror 102 can be controllably rotated via a stepper motor 104, such that the mirror's angle with respect to the object 20 and direction of carriage varies, i.e., the mirror 102 has a variable field-of-view. In use, the mirror 102 is oriented at a first angle, and the carriage 50 is moved under the object 20, channeling light reflecting off the object at a first angle into the sensor 100. This produces a first image of the object 20. Subsequently, the mirror 102 is rotated to a second angle, and the carriage is again moved under the object. Light reflecting off the object at a second angle is channeled into the sensor 100, producing a second image of the object 20. This step is repeated for as many times as desired, resulting in a series of different images, which can then be used for stereoscopic purposes or for rendering a three-dimensional structure of the object 20. The resolution of this process can be as fine as desired, i.e., by incrementally rotating the mirror for each of a number of successive scan passes.

As should be appreciated, each of the 3-D scanners 40a-40c and 40e can be used for "conventional" scanning by utilizing the scanned "vertical" image by itself (e.g., the image captured by the vertically-oriented CCD array 56b, the middle CCD array 80b, or the CCD array 100 with the rotating mirror 102 positioned at the appropriate angle). Accordingly, the present invention may be implemented as a scanner or photocopier that normally functions like a conventional scanner or photocopier, but that can also be directed to perform 3-D scans. Alternatively, the present invention can be adapted for use in augmenting existing scanners or photocopiers to give them 3-D imaging capability. Either option would make the scanner or photocopier more attractive to potential purchasers, and would obviate the need for a stand-alone 3-D scanner.

Figure 9:
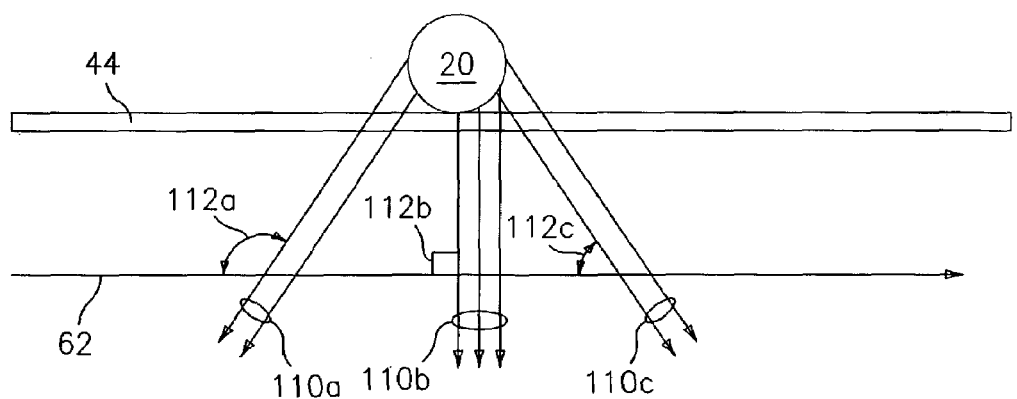
FIG. 9 is a schematic side elevation view illustrating how the method for three-dimensional scanning is implemented according to the present invention.

Turning now to FIG. 9, the method for three-dimensional optical scanning according to the present invention will be explicitly reiterated. By "three-dimensional scanning," it is meant that information about the three-dimensional structure of a object is obtained by recording or sensing electromagnetic radiation (typically, visible-spectrum light) reflected off the object. To obtain information about the structure of an object 20, the object is placed on the flat, transparent plate 44 of a scanner 40a-40e. During the process, the object remains stationary (i.e., is not moved). Subsequently, light is shined on the object 20, which reflects off the object in all directions. For example, in FIG. 9, light 110a-110c shines off the object 20 in three directions, each of which is at a different angle 112a-112c, respectively, with respect to the path of travel 62 of a carriage portion of the scanner (this is also the longitudinal axis of the scanner). The next step is to discreetly capture or sense the light reflecting off the object at two or more different angles (i.e., light oriented at two or more different angles with respect to the path 62), typically across the entirety of the functional scanning area of interest of the scanner. This is accomplished by moving the carriage 50 under the transparent sheet 44 along its movement path 62, and appropriately channeling or capturing the light 110a-110c. More specifically, in the case of a moving-sensor 3-D scanner 40a, 40b, the scanners directly sequentially encounter the light reflecting off the object at a particular angle. In the case of a moving-mirror 3-D scanner 40c-40e, the light reflecting off the object at different angles is reflected off one or more appropriately-angled mirrors and into one or more stationary CCD arrays or other sensors. Of course, as the light is serially or sequentially sensed, the output of the CCD arrays or other sensors is processed by the scanner (if needed) and sent to a computer for viewing, storage, 3-D rendering, or other processing. It should also be noted that if the present invention is adapted for use as or with a photocopier, the light from the different views of the scanned object 20 could be: (i) electronically stored and then printed once all the different images of the object were finally assembled; or (ii) respectively transferred to a series of photoreceptive drums for direct printing.

Figure 10:
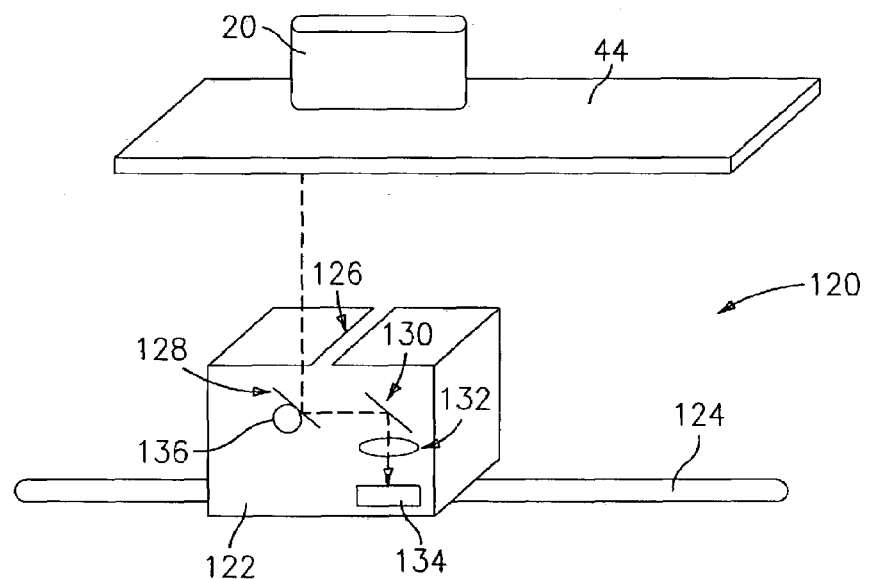
FIGS. 10-12 are schematic side elevation views of additional embodiments of the 3-D scanner according to the present invention.
Figure 11:
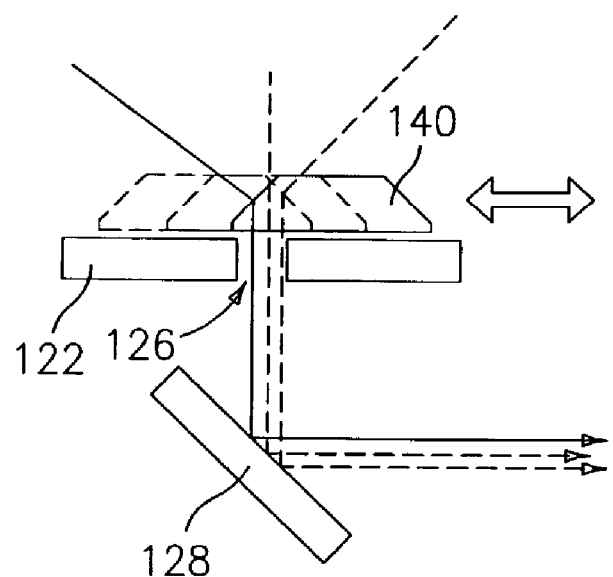

FIGS. 10 and 11 further show how the present invention can be used in the context of existing flatbed scanners. In FIG. 10, a 3-D scanner 120 has an integrated carriage unit 122, generally similar to those found on many flatbed scanners. The carriage unit 122 moves under the scanner's flat glass plate 44 on one or more rails 124, and includes: a lateral slit or aperture 126; a first rectangular mirror 128 optically aligned with the slit 126; a second rectangular mirror 130 optically aligned with the first rectangular mirror 128; a lens system 132 optically aligned with the second rectangular mirror 130; and a CCD array or other sensor 134 optically aligned or coupled with the lens system 132. In use as a conventional scanner, light reflected off the object 20 would pass straight down through the glass 44, through the lateral slit 126, and would be reflected off the two mirrors 128, 130, through the lens system 132, and into the sensor 134. The lens system 132 and mirrors 128, 130 would be optically configured to focus and/or reduce the light in size for reception by the CCD array 134.

In the scanner 120, though, light from different directions (e.g. other than straight down from the object 20) must be captured. Accordingly, the first mirror 128 is attached to a stepper motor 136, which can be used to vary the angle of the mirror 128. Also, the lateral slit 126 is appropriately configured to pass light reflecting from the object 20 from different directions, either by making the slit relatively wide or by having the slit move in conjunction with the mirror 128. Further, the mirrors 128, 130 and lens system 132 are optically configured for a deep depth-of-focus. In use, the stepper motor 136 is controlled to position the mirror 128 at a first angle, a light source 52 is turned on, and the carriage 122 is passed under the object 20. Subsequently, at least one more pass under the object 20 is made, with the angle of the mirror 128 being changed each time. This results in two or more different views of the object 20.

FIG. 11 shows how a similar result can be obtained without a motorized mirror. There, the lateral slit 126 is provided with a movable (slidable or rotatable) compound prism 140, which may be disposed above or below the slit, or within the slit. As indicated, the prism 140 can be moved so that it selectively channels light that reaches the slit from different directions down to the mirror 128, which is stationary. The mirror 128 reflects the light to the second mirror 130, which reflects it down through the lens system 132 and into the CCD array 134. Also, as should be appreciated, a compound mirror (as shown in FIGS. 6 and 7) and additional sensors could be used as well.

Figure 12:
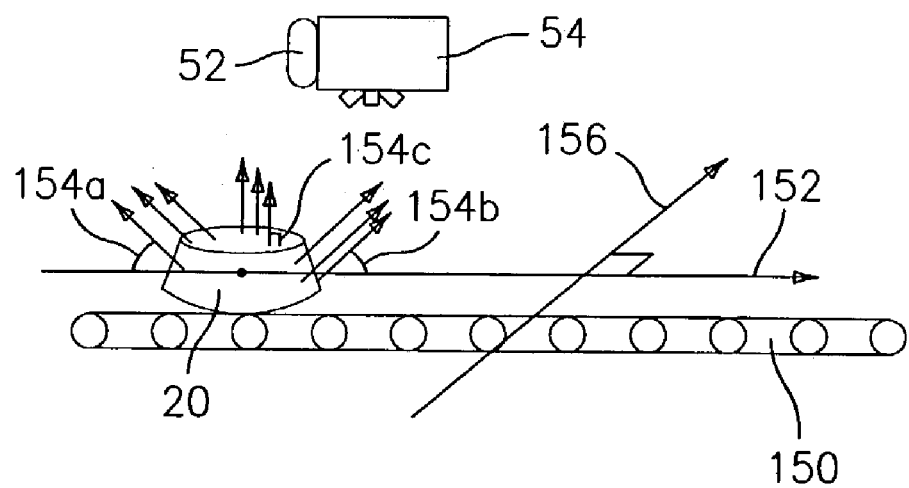

While the 3-D scanner of the present invention has been generally illustrated as having a moving carriage or sensor assembly, it should be appreciated that it could be implemented as a scanner where the object being scanned is moved (along a scanning path of travel, which corresponds to the longitudinal axis of the scanner/sensor, and not laterally) with respect to a stationary sensor assembly, instead of vice versa (this might be done, e.g., for scanning parts during a manufacturing process). An example of such a system is shown in FIG. 12. There, a sensor assembly 54 and light 52 are placed above a conveyor belt 150, which conveys an object 20 in a linear direction along a scanning path of travel 152. The sensor assembly 54 is configured to receive and sense light reflecting off the object 20 at two or more different angles with respect to the scanning path of travel 152. For example, in FIG. 12 the sensor assembly 54 captures light reflecting off the object 20 at angles 154a-154c. During the scanning process the object 20 is not moved laterally with respect to the scanning path of travel.

As should be appreciated, the term "different angles with respect to a scanning path of travel" encompasses situations where the object being scanned is moved with respect to a stationary scanner, and where a scanner or carriage is moved with respect to a stationary object (i.e., above, it is noted that the angles are with respect to the carriage's or scanner's path of movement—in this instance the scanner/carriage's path of movement corresponds to the scanning path of travel). In the case of the latter, there is no movement of the object at all, and in the case of the former there is only movement of the object along the scanning path. In neither case is there lateral movement of the object, e.g., no movement in the direction 156 shown in FIG. 12.

For capturing stereoscopic images of an object, light reflecting off the object at two different angles (with respect to a scanning path of travel) must be captured. However, as noted above, capturing an image at a third angle provides further information about the three-dimensional structure of the object, and can be useful for improving the quality of any rendered 3-D models of the object. Additionally, the number of images, each of the object at a different angle with respect to the scanning path of travel, can be increased to more than three, for purposes of obtaining more detailed structural information and for improved rendering/modeling. These multiple images can be obtained in a single pass, with a properly configured optics system.

The incidence angles (angles of sensed light with respect to scanning path of travel) can be set during the scanner design phrase and/or during assembly. Accordingly, the incidence angles remain fixed, which greatly improves repeatability and virtually eliminates the need for calibration.

While the 3-D scanner has been generally illustrated as being implemented using CCD sensors, any other type of image sensor, image capture device, or light or other electromagnetic radiation recording device could be used instead.

Also, while the 3-D scanner has been shown as having certain conventional features, e.g., the backdrop-like cover, such features may be eliminated in certain situations and depending on the particular implementation of the 3-D scanner. Also, in certain situations it may not be necessary to have a transparent plate, especially where there is no need for supporting the object being scanned. For example, in the "overhead" scanner shown in FIG. 12, there is no need for a transparent plate since the object(s) being scanned is supported by a conveyor.

Since certain changes may be made in the above-described optical scanner for three-dimensional scanning of objects, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A scanning system comprising:
a support apparatus comprising: a support bed and a carriage moveably coupled to the support bed;
a transparent plate attached to the support bed above the carriage;
a sensor assembly attached to the support apparatus and comprising at least one sensor and a white, non-coherent light source, said sensor assembly being configured for three-dimensional scanning of an object placed on the transparent plate by: shining white, non-coherent light on the object; and obtaining at least two scanned images of the object, each of which is from light reflecting off the object at a different angle with respect to a path of travel of the carriage and being sensed by the at least one sensor, wherein the at least two scanned images are stereoscopic images; and
a processor operably interfaced with the sensor assembly and configured to process said at least two scanned images of the object for at least one of (i) stereoscopic viewing of the object and (ii) three-dimensional rendering of the object.

2. The scanner of claim 1 wherein the sensor assembly comprises:
a first sensor attached to the carriage and oriented forwards with respect to the path of travel of the carriage, wherein the first sensor senses light reflecting off the object at a first angle with respect to the path of travel of the carriage;
a second sensor attached to the carriage and oriented vertically with respect to the path of travel of the carriage, wherein the second sensor senses light reflecting off the object at a second angle with respect to the path of travel of the carriage; and
a third sensor attached to the carriage and oriented rearwards with respect to the path of travel of the carriage, wherein the third sensor senses light reflecting off the object at a third angle with respect to the path of travel of the carriage.

3. The scanner of claim 1 wherein:
the at least one sensor is attached to the carriage; and
the sensor assembly further comprises an optics system attached to the carriage and configured to direct to the at least one sensor light reflecting off the object at two different angles with respect to the path of travel of the carriage.

4. The scanner of claim 1 wherein the sensor assembly further comprises an optics system configured to focus the light reflecting off the object onto the at least one sensor.

5. The scanner of claim 4 wherein the optics system is configured to have a deep depth-of-focus, wherein images of portions of the object away from the transparent plate are in focus.

6. The scanner of claim 1 wherein the sensor assembly is attached to the carriage and further comprises an optics system having: an aperture configured to admit a portion of the light reflecting off the object; and a lens system configured to focus the light reflecting off the object onto the at least one sensor.

7. A scanning system comprising:
a support apparatus comprising: a support bed and a carriage moveably coupled to the support bed;
a transparent plate attached to the support bed above the carriage;
a sensor assembly attached to the support apparatus and comprising at least one sensor and a light source, said sensor assembly being configured for three-dimensional scanning of an object placed on the transparent plate by: shining light on the object; and obtaining at least two scanned images of the object, each of which is from light reflecting off the object at a different angle with respect to a path of travel of the carriage and being sensed by the at least one sensor; and
a processor operably interfaced with the sensor assembly and configured to process said at least two scanned images of the object for at least one of (i) stereoscopic viewing of the object and (ii) three-dimensional rendering of the object; wherein:
the at least one sensor is attached to the support bed; and
the sensor assembly further comprises an optics system attached to the carriage and configured to direct to the at least one sensor light reflecting off the object at two different angles with respect to the path of travel of the carriage.

8. The scanner of claim 7 wherein:
the sensor assembly comprises at least two sensors; and
the optics system comprises a compound mirror having at least two mirror strips, each of which is oriented at a different angle with respect to the path of travel of the carriage.

9. The scanner of claim 7 wherein the optics system comprises a mirror and a positioning unit attached to the mirror and configured for controlled movement of the mirror between at least two different angular orientations of the mirror with respect to the path of travel of the carriage.

10. A scanning system comprising:
a support apparatus comprising: a support bed and a carriage moveably coupled to the support bed;

a transparent plate attached to the support bed above the carriage;

a sensor assembly attached to the carriage and comprising at least one sensor and a light source, said sensor assembly being configured for three-dimensional scanning of an object placed on the transparent plate by: shining light on the object; and obtaining at least two scanned images of the object, each of which is from light reflecting off the object at a different angle with respect to a path of travel of the carriage and being sensed by the at least one sensor, wherein the sensor assembly further comprises an optics system having: an aperture configured to admit a portion of the light reflecting off the object; and a lens system configured to focus the light reflecting off the object onto the at least one sensor; and a processor operably interfaced with the sensor assembly and configured to process said at least two scanned images of the object for at least one of (i) stereoscopic viewing of the object and (ii) three-dimensional rendering of the object;

wherein the optics system further comprises at least one mirror configured to direct the light admitted by the aperture to the lens system.

11. A scanning system comprising:

a support bed;

a transparent plate attached to the support bed;

a sensor assembly attached to the support bed under the transparent plate and comprising at least one sensor and a white, non-coherent light source, said sensor assembly being configured for three-dimensional scanning of an object placed on the transparent plate by: shining white, non-coherent light on the object; and obtaining at least two scanned images of the object, each of which is from light reflecting off the object at a different angle with respect to a longitudinal axis of the scanner and being sensed by the at least one sensor, wherein the at least two scanned images are stereoscopic images; and a processor operably interfaced with the sensor assembly and configured to process said at least two scanned images of the object for at least one of (i) stereoscopic viewing of the object and (ii) three-dimensional rendering of the object.

12. The scanner of claim 11 wherein the sensor assembly further comprises an optics system configured to direct the light reflecting off the object to the at least one sensor, and said optics system being configured to have a deep depth-of-focus, wherein images of portions of the object away from the transparent plate are in focus.

13. A scanning system for obtaining multiple stereoscopic views of an object, said system comprising:

a support apparatus comprising: a support bed and a carriage moveably coupled to the support bed;

a transparent plate attached to the support bed above the carriage and configured to support the object;

a sensor assembly attached to the support apparatus under the transparent plate, said sensor assembly comprising: at least one sensor; a white, non-coherent light source for shining white, non-coherent light on the object; and an optics system; and a processor operably interfaced with the sensor assembly; wherein:

the optics system is configured to direct light reflecting off the object to the at least one sensor, said reflected light being from at least two different angles with respect to a path of movement of the carriage and thereby representing multiple stereoscopic images of the object;

the optics system has a deep depth-of-focus wherein images formed by light reflecting off portions of the object lying away from a top surface portion of the transparent plate are in focus when directed by the optics system to the at least one sensor; and the processor is configured to process the multiple stereoscopic images of the object for at least one of (i) stereoscopic viewing of the object and (ii) three-dimensional rendering of the object.

14. A method of obtaining multiple stereoscopic images of an object, said method comprising the steps of:

positioning the object over a transparent plate, said transparent plate being positioned above a sensor assembly comprising: a linearly-movable carriage; and at least one sensor;

shining white, non-coherent light on the object;

obtaining first electrical signals that correspond to a first stereoscopic image of the object by electronically sensing, with the at least one sensor, light reflecting off the object at a first angle with respect to a path of movement of the carriage and passing through the transparent plate;

obtaining second electrical signals that correspond to a second stereoscopic image of the object by electronically sensing, with the at least one sensor, light reflecting off the object at a second angle with respect to the path of movement of the carriage and passing through the transparent plate; and electronically processing the first and second electrical signals for at least one of (i) stereoscopically viewing the object and (ii) producing an electronic three-dimensional rendering of the object.

15. The method of claim 14 further comprising the step of obtaining electrical signals that correspond to a third image of the object by electronically sensing, with the at least one sensor, light reflecting off the object at a third angle with respect to the path of movement of the carriage and passing through the transparent plate.

16. A method of obtaining multiple stereoscopic images of an object, said method comprising the steps of:

positioning the object over a transparent plate, said transparent plate being positioned above a sensor assembly comprising: a linearly-movable carriage; and at least one sensor;

shining light on the object;

obtaining first electrical signals that correspond to a first stereoscopic image of the object by electronically sensing, with the at least one sensor, light reflecting off the object at a first angle with respect to a path of movement of the carriage and passing through the transparent plate;

obtaining second electrical signals that correspond to a second stereoscopic image of the object by electronically sensing, with the at least one sensor, light reflecting off the object at a second angle with respect to the path of movement of the carriage and passing through the transparent plate;

electronically processing the first and second electrical signals for at least one of (i) stereoscopically viewing the object and (ii) producing an electronic three-dimensional rendering of the object; wherein:

the sensor assembly further comprises at least one mirror attached to the carriage; and the electrical signals are obtained by moving the carriage and the at least one mirror under the transparent plate along the path of travel of the carriage, said at least one mirror being configured to direct the reflected light into the at least one sensor.

17. An imaging process comprising the steps of:

placing a three-dimensional object on a transparent plate, wherein: a first portion of the object lies in contact with a top surface of the transparent plate and a second portion of the object lies away from the top surface of the transparent plate; the transparent plate has a longitudinal axis; and the transparent plate lies above a sensor assembly comprising at least one sensor and a carriage;

shining white, non-coherent light on the object, wherein light reflects off the object in a plurality of directions and down through the transparent plate;

moving the carriage, located underneath the transparent plate, along the longitudinal axis of the transparent plate;

electronically sensing first light reflecting off the first and second portions of the object at a first angle with respect to the longitudinal axis of the transparent plate and passing down through the transparent plate;

electronically sensing second light reflecting off the first and second portions of the object at a second angle with respect to the longitudinal axis of the transparent plate and passing down through the transparent plate, wherein once placed on the transparent plate, the object remains stationary during the imaging process, and wherein the first and second electronically sensed light comprise complementary stereoscopic images of the object; and electronically processing the first and second electronically sensed light for at least one of (i) stereoscopic viewing of the object and (ii) producing an electronic three-dimensional rendering of the object.

18. An imaging process comprising the steps of:

placing a three-dimensional object on a transparent plate, wherein: a first portion of the object lies in contact with a top surface of the transparent plate and a second portion of the object lies away from the top surface of the transparent plate; the transparent plate has a longitudinal axis; and, once placed on the transparent plate, the object remains stationary during the imaging process;

shining white, non-coherent light on the object, wherein white, non-coherent light reflects off the object in a plurality of directions and down through the transparent plate;

moving a sensor assembly located underneath the transparent plate along the longitudinal axis of the transparent plate and across a scanning area of interest, wherein as the sensor assembly moves along the longitudinal axis of the transparent plate the sensor assembly is configured to:

sequentially focus and electronically sense light reflecting off the first and second portions of the object at a first angle with respect to the longitudinal axis of the transparent plate and passing down through the transparent plate, wherein the sequentially focused and electronically sensed light reflecting off the object at the first angle corresponds to a first stereoscopic image of the object; and sequentially focus and electronically sense light reflecting off the first and second portions of the object at a second angle with respect to the longitudinal axis of the transparent plate and passing down through the transparent plate, wherein the sequentially focused and electronically sensed light reflecting off the object at the second angle corresponds to a second stereoscopic image of the object; and electronically processing the first and second stereoscopic images of the object for at least one of (i) stereoscopic viewing of the object and (ii) producing an electronic three-dimensional rendering of the object.

19. A method of obtaining multiple stereoscopic images of an object, said method comprising the steps of:

positioning the object over a transparent plate, said transparent plate being positioned above a sensor assembly comprising: a linearly-movable carriage; and at least one sensor;

shining white, non-coherent light on the object;

obtaining electrical signals that correspond to a first stereoscopic image of the object by electronically sensing, with the at least one sensor, light reflecting off the object at a first angle with respect to a path of movement of the carriage and passing through the transparent plate;

obtaining electrical signals that correspond to a second stereoscopic image of the object by electronically sensing, with the at least one sensor, light reflecting off the object at a second angle with respect to the path of movement of the carriage and passing through the transparent plate; and obtaining electrical signals that correspond to a third image of the object by electronically sensing, with the at least one sensor, light reflecting off the object at a third angle with respect to the path of movement of the carriage and passing through the transparent plate.

20. A method of obtaining multiple stereoscopic images of an object, said method comprising the steps of:

positioning the object over a transparent plate, said transparent plate being positioned above a sensor assembly comprising: a linearly-movable carriage; and at least one sensor;

shining light on the object;

obtaining electrical signals that correspond to a first stereoscopic image of the object by electronically sensing, with the at least one sensor, light reflecting off the object at a first angle with respect to a path of movement of the carriage and passing through the transparent plate;

obtaining electrical signals that correspond to a second stereoscopic image of the object by electronically sensing, with the at least one sensor, light reflecting off the object at a second angle with respect to the path of movement of the carriage and passing through the transparent plate; and obtaining electrical signals that correspond to a third image of the object by electronically sensing, with the at least one sensor, light reflecting off the object at a third angle with respect to the path of movement of the carriage and passing through the transparent plate, wherein: (i) the sensor assembly further comprises at least one mirror attached to the carriage; and (ii) the electrical signals are obtained by moving the carriage and the at least one mirror under the transparent plate along the path of travel of the carriage, said at least one mirror being configured to direct the reflected light into the at least one sensor.

* * * * *